UNITED STATES PATENT OFFICE.

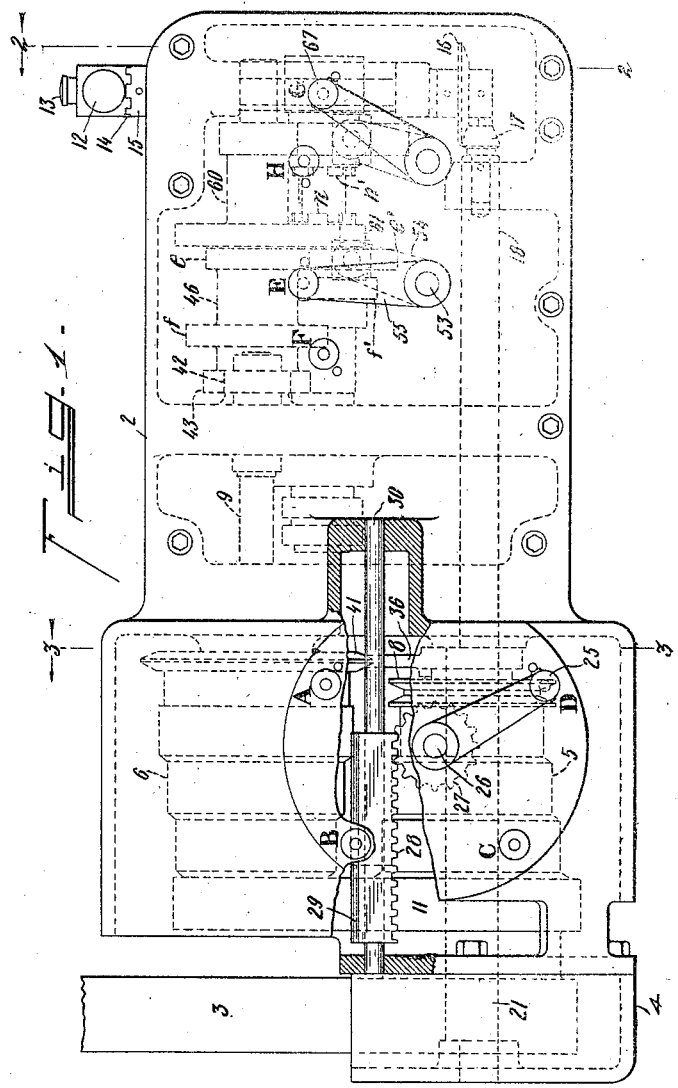

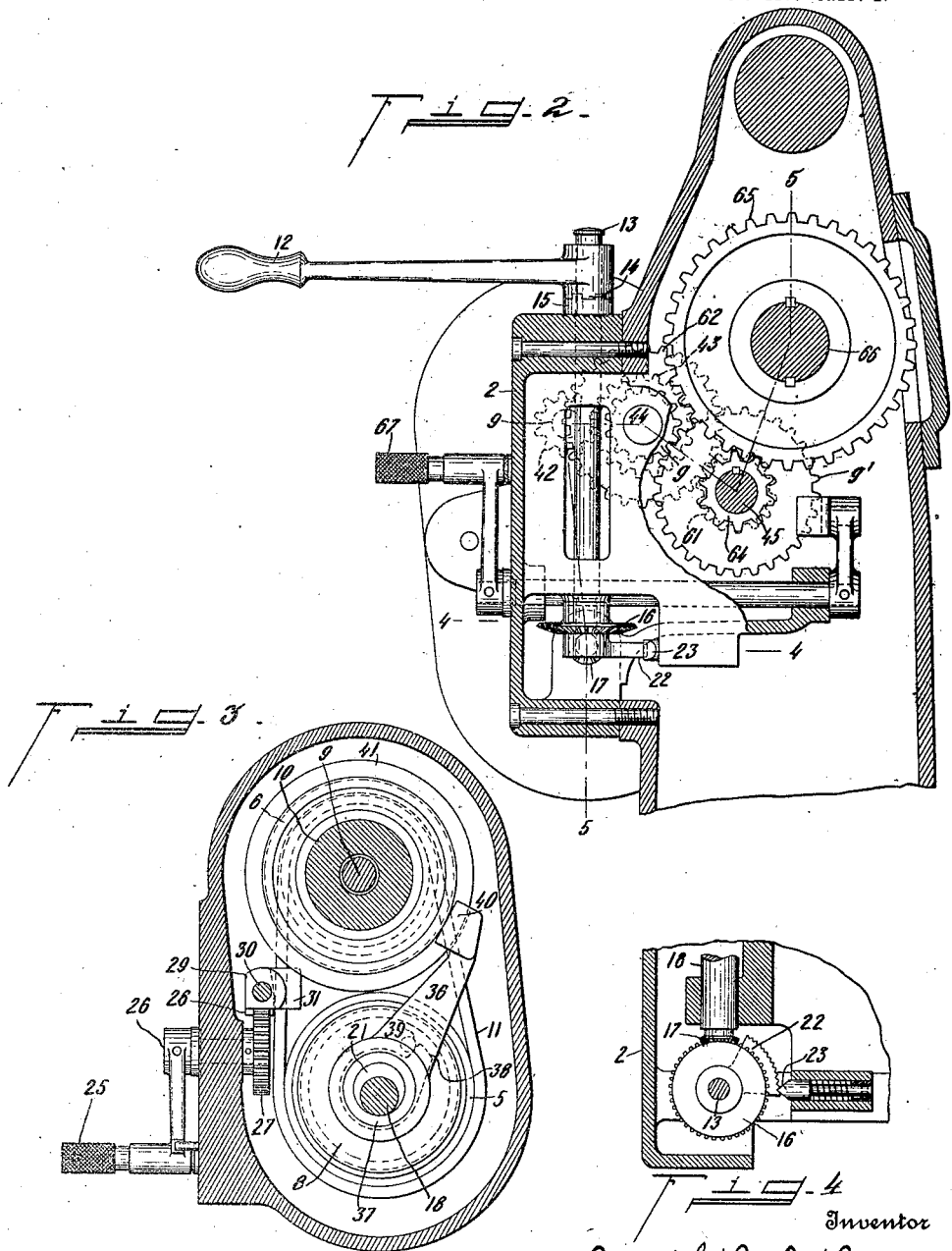

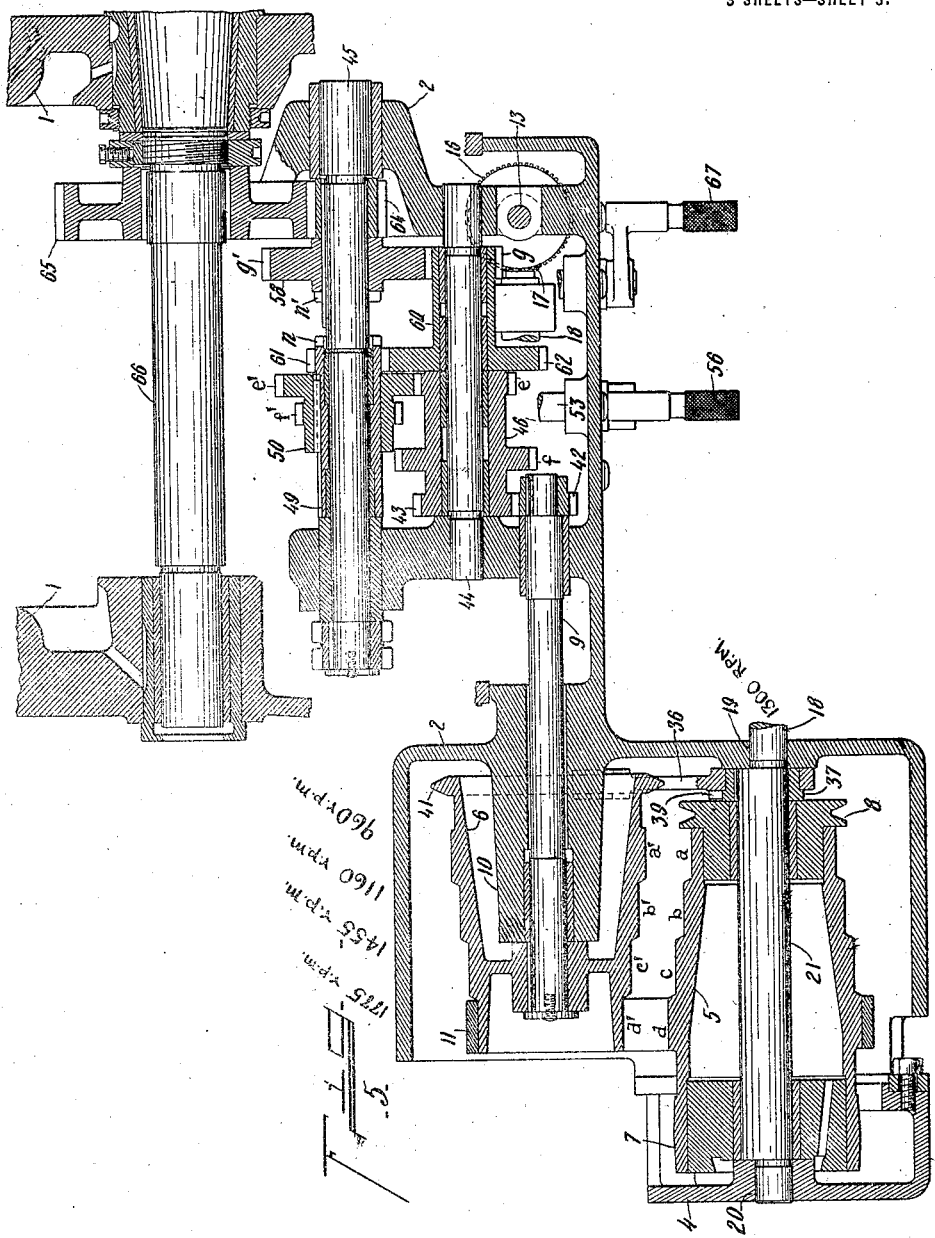

ADOLPH L. DE LEEUW, OF CINCINNATI, OHIO, ASSIGNOR TO THE CINCINNATI MILLING MACHINE COMPANY, OF OAKLEY, CINCINNATI, OHIO, A CORPORATION OF OHIO.

HIGH-POWER PULLEY-DRIVE.

1,165,369. Specification of Letters Patent. Patented Dec. 21, 1915.

Application filed May 1, 1913. Serial No. 764,829.

*To all whom it may concern:*

Be it known that I, ADOLPH L. DE LEEUW, a citizen of the United States, and residing at Cincinnati, in the county of Hamilton and State of Ohio, have invented a new and Improved High - Power Pulley - Drive, of which the following specification is a full disclosure.

This invention deals with a machine-tool organization and it proposes therefor a transmission unit embodying a pair of adjacent cone-pulleys geared to positive - drive speed change-gears, and providing hand-levers for quick manipulation all in a compact self - contained relation with the machine tool—enabling the usual cone-pulleys on the usual counter-shaft to be dispensed with, while affording an equally extended yet more immediately available speed range.

This invention also contemplates an arrangement for increasing the working capacity of a belt-driven machine tool by providing a pair of cone-pulleys built into the machine, thus providing for accurate and firm bearings permitting high speeds, and providing speed reducing gearing between the pulleys and the spindle, preferably including suitable intermediate speed change-gears, in such a ratio that the normal speed of the initial power-receiving pulley will greatly exceed that heretofore used, although maintaining conventional speeds at the spindle; thereby reducing the torque and enabling narrow belts to be used and even augmenting the power transmitted.

It is also an objective to create a few-part, compact and durable speed-change system by embodying a cycle-lever having an elementary movement such as a pure rotation (as distinguished from combined movements) and which when turned into its successive positions will yield progressive speed increases, or multiples thereof, and also embodying one or more supplementary "multiplier" levers adapted individually or mutually to determine the multiple of the speed increases afforded by said cycle-lever; thus relieving the operator from the necessity of both shifting and rotating a single lever, and enabling him, for example, by advancing the cycle-lever into its successive positions, to shift the belt of suitable cone-pulleys to attain progressively the first few speeds of the range available, as speeds $r^0$—$r'$—$r^2$—$r^3$; or by setting one or more "multiplier" levers into their second position, to enable the cycle-lever to be advanced progressively to attain the next speed series in uninterrupted sequence, as the speeds $r^4$—$r^5$—$r^6$—$r^7$; and so on.

A further object is to render available a structural unit comprising a pair of cone pulleys conversely arranged in close proximity in a gear box, the one cone-pulley having a driving pulley arranged beyond the end of the other, and the other having a live shaft extending through the frame to the part to be driven thereby; together with convenient belt shifting and tightening features.

Other objects and advantages will be in part indicated in the following description and in part rendered sufficiently apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure, and in such drawings like characters of reference denote corresponding parts throughout all the views, of which:—

Figure 1 is a side elevation of a speed-change box embodying this invention, showing the belt-shifter and gear-shifters as related in this arrangement. Fig. 2 is an end elevation of the parts within the casing looking to the left of line 2—2 of Fig. 1, showing more especially details of the belt-tightener and gear-shifters. Fig. 3 is an end elevation looking to the left of line 3—3 of Fig. 1, showing details of the belt-shifter and of the friction-brake. Fig. 4 is a detail of a ratchet-brake used to maintain the belt-tightener under any selected tension. Fig. 5 is a diagrammatic view with the parts intersected by the tortuous line 5—5 of Fig. 2 laid out in a flat plane to show the relations of the parts to one another; showing all parts related to yield the slowest drive of the spindle. Fig. 6 is a speed chart.

Continuing now by way of a more detailed description of the form of this invention herein illustrated, it will be understood that though it is shown in connection with a milling machine, it may readily be adapted to other types of machine tools, and for sundry purposes certain sub-combinations thereof may be used without others.

To give others at the outset a more intimate insight into certain characteristic relations of elements of this invention, will better enable the distinctive capacities of the illustrative structural embodiment thereof to be comprehended. In the case of a milling machine, for example, it is very desirable to enable the speed of the spindle to be varied throughout a wide range, so that the speed best suited for any given cutter and working condition may be selectively available, and it is of prime importance that this desideratum be attained without structural complexity. Preferably, the speed ratios should progress in a geometrical ratio. Assume that the speed S of the first-driven element is to be varied at the last-driven element from S to $xS$ (or any multiple of S) by $y$ changes or steps in a geometrical ratio. If $r$ represents the constant multiplier, then $$Sr^{y-1} = xS$$

and $$r = {}^{y-1}\!\sqrt{x}.$$

Concretely, if 16 changes are desired, and the spindle range is 1 to 20, then $$r = {}^{15}\!\sqrt{20} \text{ or } 1.22.$$

To attain these changes, this invention proposes a friction change-unit yielding a sub-series of speeds constituting a common-divisor of the total available changes, combined in a self-contained relation with one or more change-gears arranged in multiple series therewith and proportioned to introduce such multipliers as will enable the full range to be had. Let the friction unit yield $n$ changes (say four), and suppose a pair of two-step speed change gears be combined therewith. Then the values of $r$ for the friction unit will be $r^0$—$r'$—$r^{n-1}$ ($r^0$—$r'$—$r^2$—$r^3$); the values of $r$ for the first speed change gear may be $r'$ and $r^{n+1}$ ($r'$ and $r^5$); and the values of $r$ for the second speed change-gear may be $r^0$ and $r^{2n}$ ($r^0$ and $r^8$); yielding the full speed range. Making the lowest value of $r$ of one of the speed change-gears equal to unity ($r^0$) enables it to take the simplest structural form, as a back gear giving one direct drive. It will be noted that the high ratio equals $r^n$ times the low ratio in the first speed change-gear, and $r^{2n}$ times the low ratio in the second speed change-gear.

In its more intensive aspect, this invention also proposes a further proportioning of speeds between the several component speed-change units constituting the transmission train. That is to say, the spindle speed may, conforming with modern shop practice, range from say 20 to 400 R. P. M.; but it is intended to run the friction-unit at a very much higher speed, say 1300 more or less; and also to run the change-gear at an intermediate speed fast enough to insure easy shifting and permit of comparatively light gears, yet slow enough not to induce chatter or vibration. To this end, speed-reduction gears will preferably be arranged between the friction-unit and the speed change-gears, as well as between the speed change-gears and the spindle. It is apparent that such intermediate speed reductions may be introduced in various ways into the transmission. In the light of this explanation, the various mechanical characteristics whereby these proposals may be put into practical effect will now be made clear by an analysis of the following structural example.

The frame may advantageously be constructed in two parts such as the main frame 1 of the machine in which is journaled the spindle and is mounted the over-arm, and the box-frame 2 bolted thereto and containing as a unit the features whereby different speeds are transmitted to the spindle, thereby promoting accuracy in the mounting and relations of the change elements.

At one end, the box-frame 2 is open to receive a chain or belt 3 driven by a suitable external power-pulley (not shown), which belt passes around a pulley supported at one end by the inner wall of the box-frame and at the other end by a cap plate 4 attached to the open end of the box-frame. It is noteworthy that this frame together with the friction change units and the speed change-gears mounted therein constitutes a self-contained speed-change structure of a peculiar internal arrangement. Many advantages will be apparent, but the superior lubricating facilities offered thereby for high-speed pulleys is worthy of consideration.

The high-speed low-step cone-pulleys form elements of a friction-drive speed-change unit and are indicated by 5 and 6 respectively, and are mounted in the box-frame 2 near one end thereof. These pulleys are typical of two members, one of which impositively drives the other by friction, as distinguished from positive-drive gearing. The cone 5 is preferably longer than its companion and, if not directly connected to a power shaft, will preferably integrally provide a main pulley 7 located laterally beyond the end of the pulley 6, and adapted to receive the main driving belt 3. In this instance, the pulley 5 provides four steps $a$, $b$, $c$, and $d$, which are but slightly graduated in diameter from one another and are connected by conical merging surfaces. These steps are opposite corresponding steps $a'$, $b'$, $c'$ and $d'$ of the companion pulley 6. A grooved wheel 8 may also be carried as by the pulley 5 and used for the purpose of driving some auxiliary appliance, such as an oil-pump. The companion pulley 6 is preferably keyed to a live spindle 9 that extends through and is journaled in a boss 10 projecting from the frame; the reduced end of the driven pulley being preferably positioned toward the main driving belt 3. The ratios $\frac{a}{a'}$ etc., preferably progress in accordance with a geometrical series as explained herein, and to that end the steps are so calculated in size that a short open belt 11 may be used to transmit motion in proper ratio from the one step to the other, said belt being adapted to shift from step to step assisted by the conical surfaces, to give the desired speeds. In this instance, the diameter of $a$ and $d'$ is 4.63″; of $b$ and $c'$ is 5.13″, of $c$ and $b'$ is 5.75″ and of $d$ and $a'$ is 6.25″; thus yielding the ratios .74 .89 1.12 and 1.35 for $\frac{a}{a'} \frac{b}{b'} \frac{c}{c'}$ and $\frac{d}{d'}$ respectively, which is a series very closely conforming to $r—r'—r^2—r^3$ where $r=1.22$.

The torque-varying and braking lever is denoted by 12 and is indicative of a hand-operated member of any suitable configuration and located on the machine-tool near the point at which the tooling is being done, so that the operator may have his hand constantly on the control-lever either to disconnect the power and impose friction to terminate more quickly the rotation of the spindle, or progressively to increase the driving torque from zero to any desired degree— all while he is in whatever station he may have selected close to the work to enable him to watch the progress of the cutting tool to the best advantage. This lever has its hub journaled to a vertical shaft 13 which projects above the right-hand end of the box 2, and it may be adjustably locked in any position to such shaft by permitting its teeth 14 to engage with corresponding teeth on a collar 15 fixed to the shaft. By rocking the shaft 13, the distance between the cone pulleys may be varied thus loosening or tightening the driving belt therebetween, and this effect is obtained by means of the following construction.

The shaft 13, after entering the interior of the box 2, terminates in a beveled gear 16 keyed thereto and meshing with a gear 17 pinned to the horizontally extending shaft 18, which is journaled at 19 and 20 (see Fig. 5) and between these journals eccentrically carries a shaft 21 serving as a dead spindle, upon which the cone pulley 5 revolves. It is noteworthy that this mounting of the pulley 5 permits of ample lubrication and enables it to run at very high speeds. By rotating the shaft 18, the axis of the eccentrically positioned shaft 21 is of course swung in a circle, this varying the distance of the pulley 5 from the pulley 6. Preferably, a ratchet brake imposes resistance to the movement of the shaft 18, and enables the parts to maintain the position into which they are set by lever 12. This brake may consist of a segment 22 having its periphery corrugated and secured to move as a unit with the beveled gear 16. A wedge-shaped pin-plunger 23 is spring-pressed to engage the corrugated periphery and tends to hold the same in whatever position it may be placed by the lever 12, unless the belt should be under undue tension.

The mechanism as thus far revealed has many advantages. The operator may stand in whatever position affords the best inspection of the tooling operation, and yet by reason of the adjustability of the handle 12, he may have the transmission of power under instantaneous and sensitive control. Thus, he may move handle 12 to a point just adequate to insure a drive of the cutter for normal working conditions, and yet should a local hard spot be reached temporarily requiring unusual power, a momentary push on the handle 12 will enable the belt 11 to be tightened to a degree overcoming the unusual torque, so that the machine may operate for short intervals under emergency conditions, thus giving it a greater average capacity.

In its preferred specific form, it is proposed that this same hand-operated member 12 shall also have the capacity of more quickly terminating the rotation of the spindle when urged by pressure into one of its two extremities of movement. To enable this to be done, a friction-brake is arranged at some point in the transmission, preferably in coöperation with a high-speed element thereof, as the pulley 6, and constructing the same so that it may alternate in operation with the friction-drive means, according to whether the handle 12 is moved into one or the other side of a neutral station. A construction at once simple and effective to this end consists of an arm 36 loosely journaled on the collar 37 keyed to the shaft 21 and having a boss 38 adapted to contact with the pin 39 projecting from the arm 36, whereby its angular position may be determined. This arm 36 terminates in a V-shaped friction member 40 that rubs against the V-shaped periphery of the flange 41 integral with the pulley 6. By this means friction is imposed impeding the rotation of the pulley 6 whenever the belt 11 is loosened by the approach of the pulley 5 so as more quickly to cut down the rotation of the spindle. By reason of this construction, the shaft 18 may be rotated through 180°, while the arm may move but a few degrees into a releasing or non-braking position, thus promoting compactness.

The speed-change cycle-progressing lever herein revealed has a very simple structure and mode of operation. The operating handle 25 (Figs. 1 and 3) merely requires to be moved in an elementary direction, as in a true circle or straight line, thus avoiding the compound or step-like movements required by tumbler-gears, etc. This handle 25 yields a plurality of sub-series of speeds, each sub-series representing a complete cycle through which the handle is movable, and each sub-series being composed of a number of progressively increasing speeds, so that by advancing the handle through its first cycle, then throwing another lever to introduce a multiplier, and then advancing the handle through its next cycle, and so on, all the speeds of the system may be in turn attained. In this instance, this handle is mounted on a crank arm extending from a shaft 26 extending into the interior of the change-box and which has a pinion 27 keyed to its inner end in mesh with a rack 28, whereby a slide 29 may be reciprocated upon the guide-rod 30, and caused to shift the belt 11 by means of the wings 31, with which it is provided. At the four fixed points in the arc of movement of the handle 25 are suitable stops A—B—C and D, which, by suitable detent mechanism will temporarily maintain the position of the operating handle 25 and indicate the several increasing driving ratios provided by the belt 11 on the pulleys 5 and 6. The immediate effect of thus shifting handle 25 through the four stations A, B, C and D is to increase the speed of the driven-pulley 6 in some desired series; as in the geometrical series $r^0$—$r^1$—$r^2$—$r^3$ of the illustrated form where $r$ has a value of say 1.22. It is also notable that the intended constant speed of the pulley 5 is about 1300 R. P. M. which in this case would drive pulley 6 at about speeds 960, 1160, 1460 and 1760 R. P. M. according to the step used for the connecting belt. This represents the first cycle of this lever, but during its next cycle it should yield the speed series $r^4$—$r^5$—$r^6$—$r^7$ and to that end a multiplier $r^4$ ($r^n$) will have to be introduced, and this is accomplished by means of the following mechanism.

The first cycle-fixing or multiplier lever is denoted by 55 and has an operating handle 56 whereby it may be moved into station E (low ratio) or station F (high ratio) to introduce an appropriate multiplier into the speed series afforded by the last mentioned lever to shift its effective cycle. The shaft 9 carries a gear 42 (18 teeth) at its extremity; which is constantly in mesh with a second gear 43 (32 teeth) that drives the first gear-change element 46. It is to be noted in this connection that the pinion 42 in mesh with gear 43 is effective to reduce the speed of the motion transmitted to the first gear-change element so that the shaft 9 may be rotated quite rapidly, thereby decreasing the torque necessary at the pulleys to enable them to transmit a given power. A compact two-step gear-shift is preferred and this consists of two shafts 44 and 45 that are mounted adjacent one another in the frame of the gear-box. The element 46 which is driven by the gear 43 is loosely mounted on shaft 44 and carries a small driving-gear $e$ (30 teeth) and a larger driving-gear $f$ (44 teeth). Loosely mounted on the shaft 45 is a sleeve 49 to which is splined a second sleeve 50 carrying a larger driven-gear $e'$ (45 teeth) and a smaller driven-gear $f'$ (31 teeth). By shifting the sleeve 50 in an axial direction, gears $f$ and $f'$ may be intermeshed, or gears $e$ and $e'$ may be intermeshed, as desired. This gear shift is readily accomplished by means of a rock shaft 53, from which extends an arm 54 (Fig. 1) having a forked end pivoted thereto, and engaging the sides of the gear $e'$, so that when said shaft is rocked by swinging the arm 55 by means of the handle 56 into one of its temporarily restrained positions, the above-mentioned gear-shift will be effected to change the transmission ratio as explained. It is noteworthy that while the pulley 6 in this instance runs at the very high speed range of from 960 R. P. M. to 1775 R. P. M., the speed of the gear element 46 only ranges from 540 to 990 or about one-half that of the belt-drive unit, and the speed range of the gear element 50 has even lower limits. Thus, the speeds of the change-gear are very materially less than those of the cone-pulleys, while yet, as will be seen shortly, they are materially greater than those of the spindle.

The second cycle-fixing or multiplier lever is operated by the handle 67 which is arranged on a lever and constructed in the manner already described in connection with the handle 56. This second lever operates a second gear shift which by reason of utilizing values of $r^0$ and $r^{2n}$ may embody a direct clutch drive of unity ($r^0$) and thus make for structural simplicity. To this end, it is proposed to utilize a back gear arrangement which comprises a shifting part 58 splined to the shaft 45 and having the clutch teeth $n'$ adapted to engage with corresponding teeth $n$ on the sleeve 49, thereby effecting a direct driving connection ($r^0$) between the sleeve 50 and the shaft 45. In this position, a sleeve 60 journaled on the shaft 44 is driven idly by the pinion 61 (19 teeth) secured to the sleeve 49 and which engages the gear 62 (41 teeth) secured to the sleeve 60. In its other shifted position, however, the teeth $n'$ are disconnected from the teeth of the sleeve 49 and the gear $g'$ (42 teeth) is meshed with the pinion $g$ (18 teeth) on the sleeve 60 so that power is transmitted to the shaft 45 through the intermediary of the sleeve 60. The shaft 45 also carries a pinion 64 (16 teeth) that meshes with a gear 65 (56 teeth) keyed to the spindle 66 which is suitably journaled in the frame.

By virtue of this arrangement, the speeds of the spindle may be increased progressively in any desired ratio as for example in a geometrical ratio. Thus assuming the parts are positioned as shown by Fig. 5, the first four speeds of the series are obtained by merely shifting the main lever through positions A, B, C and D. To obtain the next four speeds, the handle 56 is shifted to position F and then the main lever is shifted progressively through its four successive positions. By similarly manipulating the three levers sixteen progressive speeds are available according to the chart shown on Sheet 1 of the drawings.

Without further elaboration, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims

Having thus described this invention, I claim as new and desire to secure by Letters Patent of the United States:—

1. A machine-tool organization of the nature disclosed combining a frame, a pair of pulleys each mounted in said frame adjacent one another, one of said pulleys being a step-cone-pulley, a belt connecting said pulleys, means for adjusting the proximity of said pulleys to tighten the belt, one of said pulleys providing at one end a plain pulley adapted to receive a main power-driven belt, and machine elements mounted on said frame having a driven connection with the other pulley of said pair.

2. A machine-tool organization of the nature disclosed combining a frame, a pair of pulleys each mounted in said frame adjacent one another, one of said pulleys being a step-cone-pulley, a belt connecting said pulleys, means for adjusting the proximity of said pulleys to tighten the belt, one of said pulleys providing at one end a plain pulley, arranged at one side of the other pulley and adapted to receive a main power-driven belt, said other pulley being mounted on a live-spindle extending through said frame and terminating in a gear, and machine elements mounted on said frame having a driven connection with the other pulley of said pair.

3. A machine-tool organization of the nature disclosed combining a frame, a live-spindle mounted on said frame, a dead-spindle mounted on said frame, a pair of pulleys, the one fixed to said live-spindle and the other journaled on said dead-spindle, one of said pulleys being a step-cone-pulley, a shiftable belt connecting said pulleys, means operating in connection with said dead-spindle for regulating the tension of said belt, and a plain pulley in unitary relation with one of said pulleys adapted to receive the main power-driving belt.

4. A machine-tool organization of the nature disclosed combining a frame, a rock-shaft and a live-spindle both journaled in said frame in proximity, said rock-shaft having a bearing surface eccentric to its axis, a pulley journaled on said bearing surface, a plain pulley in unitary relation therewith adapted to be driven by a power-belt, a pulley secured to said live-spindle opposite said first mentioned pulley, one of said last two mentioned pulleys being a step-cone-pulley, a belt connecting said pulleys, means for rocking said shaft to tension said belt, and machine elements mounted on said frame having a driven connection with said live-spindle.

5. A machine-tool organization of the nature disclosed combining a frame, a rock-shaft and a live-spindle both journaled in said frame in proximity, said rock-shaft having a bearing surface eccentric to its axis, an arm actuated by said rock-shaft, a pulley journaled on said bearing surface, a pulley secured to said live-spindle, a lever for manually turning said rock-shaft to vary the proximity of said pulleys and simultaneously cause said arm to impose friction on the pulley mounted on said live-spindle, a shiftable belt connecting said pulleys, power-driven means for rotating the pulley on said rock shaft, and machine-elements mounted on said frame actuated from said other pulley.

6. A machine-tool organization of the nature disclosed combining a driven machine-element, a power-receiving unit comprising high-speed cone-pulleys and a main driving-pulley therefor, a change-gear interposed between said element and said high-speed unit, a speed-reduction gear transmitting motion from said unit to said change-gear, and gearing connecting said change-gear with said driven machine-element.

7. A machine-tool organization of the nature disclosed combining a driven machine-element, a power-receiving unit comprising high-speed cone-pulleys and a main driving-pulley therefor, a change-gear interposed between said element and said high-speed unit, gearing connecting said unit and said change-gear, and reduction-gearing connecting said change-gear and said machine-element.

8. A machine-tool organization of the nature disclosed combining a driven machine-element, a power-receiving unit comprising high-speed cone-pulleys and a main driving-pulley therefor, a change-gear interposed between said elements and said high-speed unit, and two speed-reduction gears, the one interposed between said element and said change-gear and the other between said change-gear and said high-speed unit.

9. A machine-tool organization of the nature disclosed combining a power-receiving unit comprising high-speed cone-pulleys and a main driving-pulley therefor, a first change-gear, a second change-gear, a driven machine element, said parts being arranged in series in the order enumerated, and a speed-reduction gear interposed in series between two of said parts.

10. A machine-tool organization of the nature disclosed combining a power-receiving unit comprising high-speed cone-pulleys and a main driving-pulley therefor, a first change-gear, a second change-gear, a driven machine element, said parts being arranged in series in the order enumerated, and a speed reduction gear in series between said unit and said first change gear.

11. A machine-tool organization of the nature disclosed combining a power-receiving unit comprising high-speed cone-pulleys and a main driving-pulley therefor, a first change-gear, a second change-gear, a driven machine element, said parts being arranged in series in the order enumerated, and a speed-reduction gear between said machine-element and said second change-gear.

12. A machine-tool organization of the nature disclosed combining a power-receiving unit comprising high-speed cone-pulleys and a main driving-pulley therefor, a first change-gear, a second change-gear, a driven machine element, said parts being arranged in series in the order enumerated, a speed-reduction gear between the high-speed unit and the first change-gear, and a second speed-reduction gear between the second change-gear and the machine-element.

13. A machine-tool organization of the nature disclosed combining a driven machine element, a power-receiving unit comprising high-speed friction-members and a main driving-pulley therefor, a change-gear interposed between said element and unit, and a change back-gear between said change gear and said element.

14. A machine-tool organization of the nature disclosed combining a machine-element, a power-receiving unit comprising high-speed friction-members and a main driving-pulley therefor, said unit having a limited speed range of slightly graduated ratios, a change-gear in series with said unit and having a speed-change step exceeding the speed range of said unit, a back-gear in series with said change-gear having a speed-step exceeding that of the combined range of said change-gear and unit, and speed-reduction gearing arranged between said unit and said machine element, all of said parts being in series.

15. A machine-tool organization of the nature disclosed combining a spindle, a power-driven member, a belt-drive unit and suitable gearing forming a transmission train from said member to said spindle, means for adjusting the tension of said belt, a lever for controlling the operation of said means, and means for selectively determining the normal position of said lever with relation to said means.

16. A machine-tool organization of the nature disclosed combining a spindle, a power-driven member, a belt-drive unit and suitable gearing forming a transmission train from said member to said spindle, means for adjusting the tension of said belt, a friction-brake impeding the movement of said means, and a hand-lever for operating said means in opposition to said frictional resistance.

17. A machine-tool organization of the nature disclosed combining a spindle, a power-driven member, a belt-drive unit and suitable gearing forming a transmission train from said member to said spindle, means for adjusting the tension of said belt, and a hand-lever located adjacent the working-end of said spindle and adjustably connected to said means whereby its normal position relative to said means may be initially varied to enable said means to be actuated by said handle from various positions selected by the attendant.

18. A machine-tool organization of the nature disclosed combining a spindle, a power-driven member, a belt-drive unit and suitable gearing forming a transmission train from said member to said spindle, means for adjustably determining the tension of said belt, a ratchet-brake for yieldably maintaining the position of said means, and a hand-lever adapted to be manually actuated to operate said means.

19. A machine-tool organization of the nature disclosed combining a spindle, a power-driven member, a belt-drive unit and suitable gearing forming a transmission train from said member to said spindle, means for adjusting the tension of said belt, means for frictionally impeding free rotation of said train, a lever for controlling the operation of both of said means, and means for selectively determining the normal position of said lever with relation to said means.

20. A machine-tool organization of the nature disclosed combining a spindle, a power-driven member, a belt-drive unit and suitable gearing forming a transmission train from said member to said spindle, friction-impeded means for adjusting the tension of said belt, means for frictionally impeding free rotation of said train, and a hand-lever movable in one direction for operating said tensioning means in opposition to said frictional resistance; said lever being movable in another direction to render said second means effective.

21. A machine-tool organization of the nature disclosed combining a frame, a spindle, a power-driven member, a friction-drive unit and positive-drive gearing forming a speed-reduction transmission train from said member to said spindle, means for varying the driving-friction of said unit, a device for yieldably maintaining said means in any predetermined position, an operating-lever for actuating said means and adjustably connected therewith whereby its normal position relative to said means may be initially varied to enable the neutral station of said lever to be set at any predetermined point in the arc of movement of said lever, and brake-mechanism for impeding rotation of said train actuated by said lever during its movement away from its neutral station.

22. A machine-tool organization of the nature disclosed combining a power-driven member, an ultimately-driven member, a transmission train therebetween comprising a high-speed friction-drive change-unit, a multiple series of change gears, means for regulating the driving-friction of said change-unit from zero progressively to a predetermined maximum, a friction-brake for impeding the free rotation of said transmission train, a single member having a handle located closely adjacent the working end of said ultimately-driven member and connected with said friction controlling means whereby in one extreme position said friction-brake will be made operative and adapted when moved toward its other extreme position first to render said brake inoperative and progressively augment the driving capacity of said friction-unit; and a frame mounting all of said parts to form a self-contained structural entity.

23. A speed change organization of the nature disclosed combining a power-driven high-speed friction speed-change mechanism, a shift means varying the transmitting speed thereof by closely graduated steps, a positive-drive change-gear geared in multiple series to said mechanism, a spindle driven by said organization, and two speed-reduction gearings, the one between said friction-mechanism and said change-gear, and the other between said change-gear and said spindle.

24. A speed-change organization of the nature disclosed combining a power-driven high-speed friction speed-change mechanism, a shift means varying the transmitting speed thereof by closely graduated steps, a positive-drive change-gear geared to said mechanism, a second positive-drive change-gear in multiple series with said first change-gear, a spindle driven by said organization, and two speed-reduction gearings, the one between said friction mechanism and said first change-gear, and the other between said second change-gear and said spindle.

25. A speed-change organization of the nature disclosed combining a power-driven high-speed friction speed-change mechanism, a shift means varying the transmitting speed thereof by closely graduated steps, a positive-drive two-shift change-gear geared to said mechanism, shift means for operating said change-gear, a spindle driven by said organization, and two speed-reduction gearings, the one between said friction mechanism and said first change-gear, and the other between said second change-gear and said spindle.

26. A speed-change organization of the nature disclosed combining a power-driven high-speed friction speed-change mechanism, a shift means varying the transmitting speed thereof by closely graduated steps, a positive-drive two-shift change-gear geared to said mechanism, a second positive drive two-shift change-gear in multiple series therewith and having its low-shift ratio equal to unity, a spindle driven by said organization, and two speed-reduction gearings, the one between said friction mechanism and said first change-gear, and the other between said second change-gear and said spindle.

27. A unitary machine-tool organization of the nature disclosed combining in compact relation a friction speed-change unit, a shift means varying the transmitting speed thereof by $n$ slightly graduated steps in geometrical progression, a positive-drive change-gear geared in series with said unit adapted to be shifted to multiply its own lowest transmitting speed by a factor of the value $r^n$, where $r$ is the constant multiplier of the said geometrical progression, and means for utilizing said organization for transmitting power.

28. A unitary machine-tool organization of the nature disclosed combining in compact relation a friction speed-change unit, a shift means varying the transmitting speed thereof by $n$ slightly graduated steps in geometrical progression, a positive-drive change-gear geared to said unit adapted to be shifted to multiply its own lowest transmitting speed by a factor of the value $r^n$, where $r$ is the constant multiplier of the said geometrical progression, a second positive-drive change-gear in series with said first change-gear and adapted to be shifted to multiply its lowest transmitting speed by a factor of the value $r^{2n}$, and means for utilizing said organization for transmitting power.

29. A unitary machine-tool organization of the nature disclosed combining in compact relation a friction speed-change unit, a shift means varying the transmitting speed thereof by $n$ slightly graduated steps in geometrical progression, a positive-drive two-shift change-gear geared to said unit and having its high-shift ratio equal to $r^n$ times its own low-shift ratio, where $r$ is the constant multiplier of the said geometrical progression, shift means for operating said change-gear, and means for utilizing said organization for transmitting power.

30. A unitary machine-tool organization of the nature disclosed combining in compact relation a friction speed-change unit, a shift means varying the transmitting speed thereof by $n$ slightly graduated steps in geometrical progression, a positive-drive two-shift change-gear geared to said unit, and having its high-shift ratio equal to $r^n$ times its low-shift ratio, where $r$ is the constant multiplier of the said geometrical progression, a second positive-drive two-shift change-gear in series therewith and having its low-shift ratio equal to unity and its high-shift ratio equal to $r^{2n}$, and means for utilizing said organization for transmitting power.

31. A unitary machine-tool organization of the nature disclosed combining a unitary power-driven friction speed-change mechanism, a shift means varying the transmitting speed thereof by $n$ slightly graduated steps in geometrical progression, a positive-drive change-gear geared in series to said mechanism adapted to be shifted to multiply its lowest transmitting speed by a factor of the value $r^n$, where $r$ is the constant multiplier of the said geometrical progression, a spindle driven by said organization, and speed-reduction gearing between said mechanism and said spindle.

32. A unitary machine-tool organization of the nature disclosed combining a unitary power-driven friction speed-change mechanism, a shift means varying the transmitting speed thereof by $n$ slightly graduated steps in geometrical progression, a positive-drive change-gear geared to said mechanism adapted to be shifted to multiply its lowest transmitting speed by a factor of the value $r^n$ where $r$ is the constant multiplier of the said geometrical progression, a second positive-drive change-gear in series with said first change-gear and adapted to be shifted to multiply its lowest transmitting speed by a factor of the value $r^{2n}$, a spindle driven by said organization, and speed-reduction gearing between said mechanism and said spindle.

33. A unitary machine-tool organization of the nature disclosed combining a unitary power-driven friction speed-change mechanism, a shift means varying the transmitting speed thereof by $n$ slightly graduated steps in geometrical progression, a positive-drive two-shift change-gear geared to said mechanism and having its high-shift ratio equal to $r^n$ times its low-shift ratio, where $r$ is the constant multiplier of the said geometrical progression, shift means for operating said change-gear, a spindle driven by said organization, and speed-reduction gearing between said mechanism and said spindle.

34. A unitary machine-tool organization of the nature disclosed combining a unitary power-driven friction speed-change mechanism, a shift means varying the transmitting speed thereof by $n$ slightly graduated steps in geometrical progression, a positive-drive two-shift change-gear geared to said mechanism, and having its high-shift ratio equal to $r^n$ times its low-shift ratio, where $r$ is the constant multiplier of the said geometrical progression, a second positive-drive two-shift change-gear in series therewith and having its low-shift ratio equal to unity and its high-shift ratio equal to $r^{2n}$, a spindle driven by said organization, and speed-reduction gearing between said mechanism and said spindle.

35. A machine-tool organization of the nature disclosed combining a unitary power-driven friction speed-change mechanism, a shift means varying the transmitting speed thereof by $n$ slightly graduated steps in geometrical progression, a positive-drive change-gear geared in series to said mechanism adapted to be shifted to multiply its lowest transmitting speed by a factor of the value $r^n$, where $r$ is the constant multiplier of the said geometrical progression, a spindle driven by said organization, and two speed-reduction gearings, the one between said mechanism and said change-gear and the other between said change gear and said spindle.

36. A machine-tool organization of the nature disclosed combining a unitary power-driven friction speed-change mechanism, a shift means varying the transmitting speed thereof by $n$ slightly graduated steps in geometrical progression, a positive-drive change-gear geared to said mechanism adapted to be shifted to multiply its lowest transmitting speed by a factor of the value $r^n$ where $r$ is the constant multiplier of the said geometrical progression, a second positive-drive change-gear in series with said first change-gear and adapted to be shifted to multiply its lowest transmitting speed by a factor of the value $r^{2n}$, a spindle driven by said organization, and two speed-reduction gearings, the one between said mechanism and the first change-gear and the other between said second change-gear and said spindle.

37. A machine-tool organization of the nature disclosed combining a unitary power-driven friction speed-change mechanism, a shift means varying the transmitting speed thereof by $n$ slightly graduated steps in geometrical progression, a positive-drive two-shift change-gear geared to said mechanism and having its high-shift ratio equal to $r^n$ times its low-shift ratio, where $r$ is the constant multiplier of the said geometrical progression, shift means for operating said change-gear, a spindle driven by said organization, and two speed-reduction gearings, the one between said mechanism and said change-gear and the other between said change-gear and said spindle.

38. A machine-tool organization of the nature disclosed combining a unitary power-driven friction speed-change mechanism, a shift means varying the transmitting speed thereof by $n$ slightly graduated steps in geometrical progression, a positive-drive two-shift change-gear geared to said mechanism, and having its high-shift ratio equal to $r^n$ times its low-shift ratio, where $r$ is the constant multiplier of said geometrical progression, a second positive-drive two-shift change-gear in series therewith and having its low-shift ratio equal to unity and its high-shift ratio equal to $r^{2n}$, a spindle driven by said organization, and two speed-reduction gearings, the one between said mechanism and the first change-gear and the other between said second change-gear and said spindle.

In witness whereof, I hereunto subscribe my name, as attested by the two subscribing witnesses.

ADOLPH L. DE LEEUW.

Witnesses:
OLIVER B. KAISER,
ALBERT F. NATHAN.